United States Patent [19]

Rolland et al.

[11] Patent Number: 5,013,394

[45] Date of Patent: May 7, 1991

[54] METHOD FOR DETECTION OF END OF GRINDING OF A THIN LAYER MAGNETIC HEAD

[75] Inventors: Jean-Luc Rolland; Jean-Yves Beguin, both of Paris; Henriette Magna, Antony; Alain Jacobelli, St Michel Sur Orge; Maurice Penot, Palaiseau, all of France

[73] Assignee: Compagnie Europeenne de Composants Electroniques LCC, Courbevoie, France

[21] Appl. No.: 381,749

[22] PCT Filed: Oct. 21, 1988

[86] PCT No.: PCT/FR88/00518
 § 371 Date: Jun. 26, 1989
 § 102(e) Date: Jun. 26, 1989

[87] PCT Pub. No.: WO89/04038
 PCT Pub. Date: May 5, 1989

[30] Foreign Application Priority Data

Oct. 27, 1987 [FR] France .................... 87 14821

[51] Int. Cl.⁵ .................. B44C 1/22; C23F 1/00; C03C 15/00; C03C 25/06
[52] U.S. Cl. .................. 156/627; 29/603; 156/645; 156/656; 156/664; 156/667
[58] Field of Search ......... 156/627, 645, 655, 656, 156/664, 665, 667; 29/603; 360/110, 119, 121, 122, 128, 137

[56] References Cited

U.S. PATENT DOCUMENTS 3,495,049 2/1970 Humphreys et al. ............ 29/603 X
3,938,193 2/1976 Sargunar ...................... 360/137
4,670,972 6/1987 Sakakima ..................... 29/603

FOREIGN PATENT DOCUMENTS 2115211 9/1983 United Kingdom .

OTHER PUBLICATIONS

Patent Abstracts of Japan, vol. 10, No. 312, (P-509)(2368), Oct. 23, 1986, & JP, A. 61122909 (Sanyo) Jun. 10, 1986.

Primary Examiner—William A. Powell
Attorney, Agent, or Firm—Oblon, Spivak, McClelland, Maier & Neustadt

[57] ABSTRACT

The invention concerns a method for the detection of the end of grinding of at least one thin layer magnetic head, the head comprising, at the stage of implementation of said method, an active face, formed by two magnetic poles (1, 2) separated by a gap (4). The method comprises the following steps:
 deposition of a conductive layer (7) on the entire active face (3)
 etching of the active face coated with said conductive layer;
 deposition of a layer of dielectric material (8) on the etched active face;
 grinding of the active face starting from the face that is free of the layer of dielectric material (8) until total removal of that part of the conductive layer (7) located above the gap (4), this removal being detected by the sudden variation in resistivity between the two magnetic poles (1, 2).

7 Claims, 3 Drawing Sheets

METHOD FOR DETECTION OF END OF GRINDING OF A THIN LAYER MAGNETIC HEAD

The present invention concerns a method for the detection of the end of grinding of a magnetic head made according to the so-called thin layer techniques.

Thin layer magnetic heads are made by successive deposits of magnetic, dielectrical and conductive materials. These layers undergo final operations for etching and grinding the magnetic poles.

The depth of the gap is a geometrical characteristic, the checking of which is fundamental for magnetic heads and, especially, for those using technologies for the deposition and etching of thin layers. In effect whereas, in a massive magnetic head (VHS or audio head for example) or in a head of the type having, on each side of the gap, a magnetic metal alloy (also called a magnetic metal alloy in gap head), the efficiency hardly varies with the depth of the gap (typically 0.05 dB/$\mu$), this is not so for heads using thin layer technologies (variation typically around 0.2 dB/$\mu$). In the latter case, it proves to be necessary to perform very precise controls on this dimension while making the head. Furthermore the values of the depth of the gap differ greatly according to the technological method used: they are of the order of 20 to 40$\mu$ for a massive head and of the order of 2 to 10$\mu$ for a thin layer head. For thin layer heads, this small depth causes a very appreciable reduction in the section of the gap and, hence, a reduction in the thermal noise related to the real part of the impedance of the head. For, the thermal noise is proportionate to the section of the gap.

It is therefore very important to be able to perform, repetitive, reliable and precise controls on the depth of the gap during the stage for finishing the active face of the head. In order to achieve this result, many methods are presently used by those skilled in the art. It is possible, during the grinding step, to measure the impedance of the head to adjust it to the desired value. It is also possible to detect the opening of the magnetic circuit of the head by measuring the inductance at the terminals of the coil. There are also optical methods for checking the depth of the gap. All these methods are generally well mastered, but they have major drawbacks: they are difficult to implement and the measured values change constantly during the process of establishing the size of the depth of the gap. The precision obtained is relatively low: about 0.5$\mu$ for a gap depth of the order of 2$\mu$.

In order to overcome these drawbacks, the invention proposes a method for the detection of the end of grinding by measurement of the variation of a signal, the sizing of the depth causing an all or nothing type of variation in the signal. The variation in the signal comes into play at the precise instant when the desired dimension is achieved.

The invention therefore has, as an object, a method for the detection of the end of grinding of at least one thin layer magnetic head, said head comprising, at the stage of implementation of said method, an active face, formed by two magnetic poles separated by a gap, the detection being obtained through the interruption of an electrical circuit, characterized in that it comprises the following steps:

deposition of a conductive layer on the entire active face to form said electrical circuit;

etching of the active face coated with said conductive layer;

deposition of a layer of dielectric material on the etched active face;

grinding of the active face starting from the face that is free of the layer of dielectric material until total removal of that part of the conductive layer located above said gap, said removal being detected by the sudden variation in resistivity between the two magnetic poles.

The invention will be better understood and other advantages will emerge from the following description, given as a non-restrictive example, and through the appended figures, of which:

The method according to the invention is based on the detection of the passage from electrical conduction to electrical insulation during the step of the method for fabrication of a magnetic head aimed at to achieving the desired gap depth. It is assumed, in the method, that there is electrical conduction between the two magnetic poles before the desired depth is achieved and insulation when the desired dimension is achieved. This method is especially well suited to thin layer heads made according to a planar method. The thickness of the magnetic layer forming the poles defines the depth of the gap.

Figure 1:
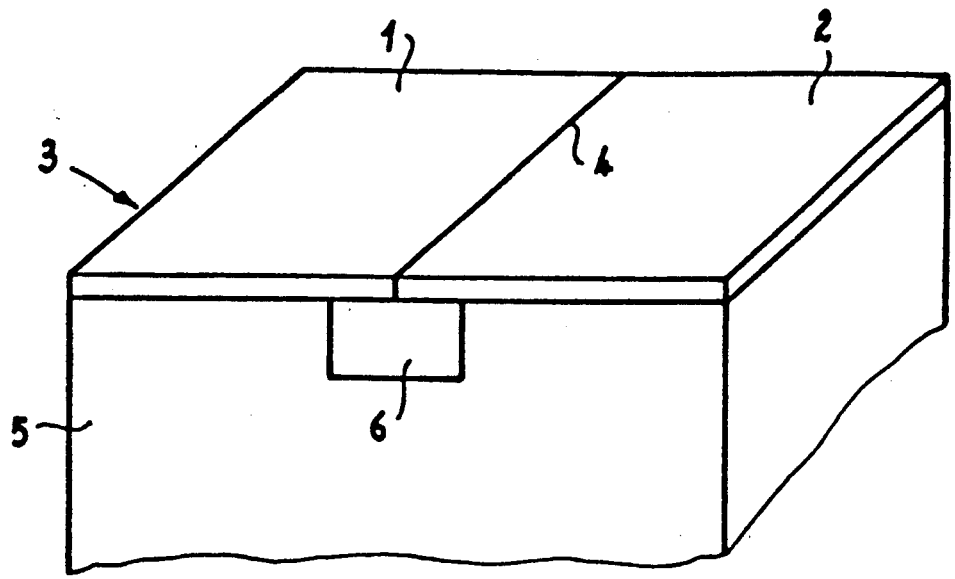
FIG. 1 shows a simplified structure of a planar head.

FIG. 1 shows a simplified structure of a planar head to which the method according to the invention can be applied particularly well. The active face 3 of the magnetic head may have a thickness of between 1 and 40$\mu$. It has a first magnetic pole 1 and a second magnetic pole 2 separated by a gap 4. The active face 3 lies on a magnetic substrate 5 containing a dielectric pad 6 located beneath the gap 4. The dielectric pad 6 is a second gap with respect to the magnetic circuit formed by the parts 1, 2 and 5. The gap 4 is located somewhat in the center of the dielectric pad 6 which may have a thickness of about some tens to some hundreds of micrometers. The constituent materials of this magnetic head are, for example, a magnetic metal alloy (FeNi, FeAlSi, CoZrNb, etc.) for the magnetic poles 1 and 2, a dielectric such as $SiO_2$ or $Al_2O_3$ for the gap 4. The dielectric pad 6 may be formed by glass or an epoxy resin. The magnetic substrate 5 may be formed by a poly or monocrystalline ferrite of manganese-zinc, namely a material with high resistivity. As an example, the widths of the gaps 4 and 6 may be 0.2$\mu$ for the first gap (or microscopic gap) and 200$\mu$ for the second gap (or macroscopic gap).

Figure 2:
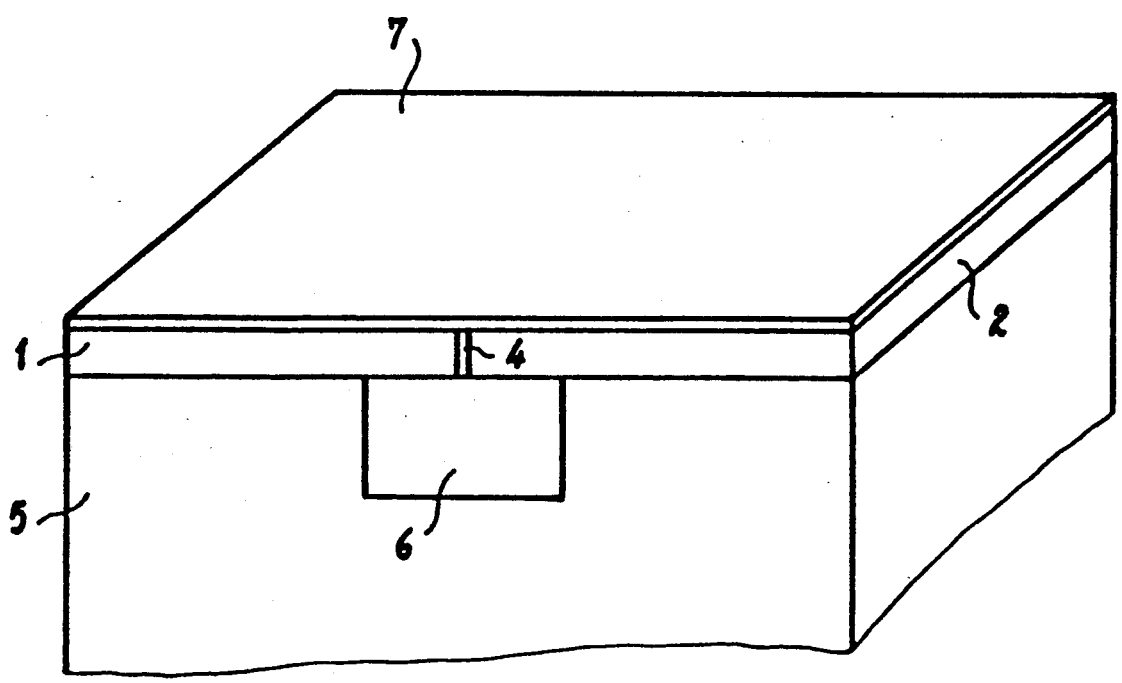
FIGS. 2 to 6 represent different steps of the method according to the invention applied to the structure shown in FIG. 1.

The planar structure shown in FIG. 1 then receives a deposit of conductive material throughout the surface of the section. The thickness of this deposit may range from some hundreds of angstroms to some tens of micrometers. This conductive material may be a layer of aluminium or chromium for example. FIG. 2 shows the previous planar structure covered with a layer 7 of conductive material. Since the magnetic material forming the poles 1 and 2 have high conductivity levels, they are also put into electrical contact.

FIGS. 1 and 2 show only one magnetic head, but it is clearly advantageous (and therein lies one of the characteristics of the invention) to make several structures on a wafer.

Figure 3:
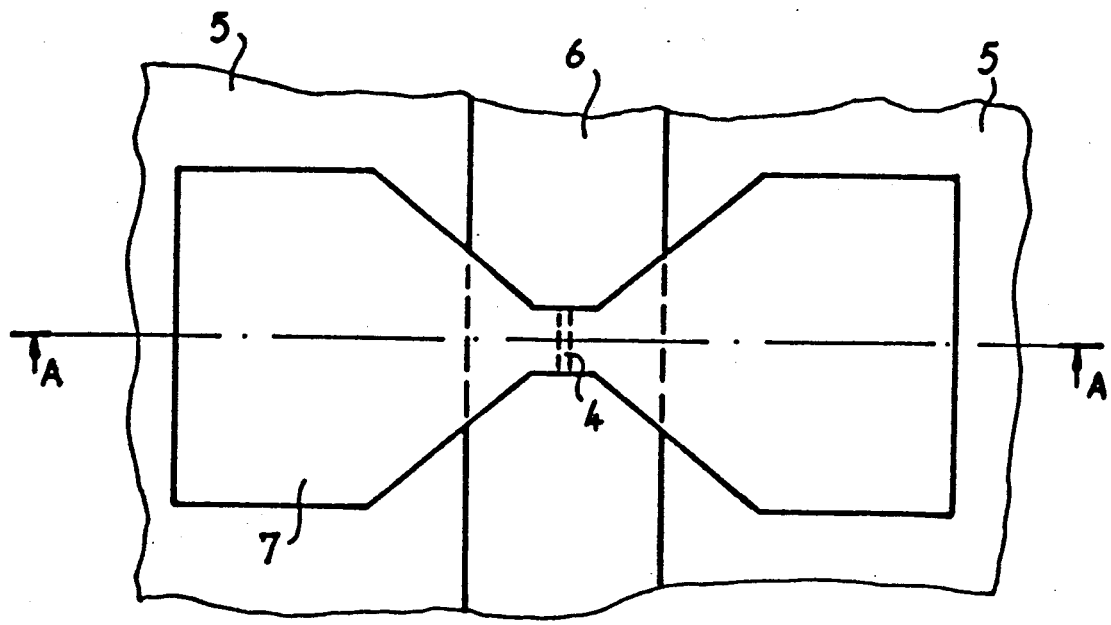

The wafer on which these structures are made is then etched in order to define the final geometry of the facing poles. FIG. 3 is a top view of a structure of this type.

Figure 4:
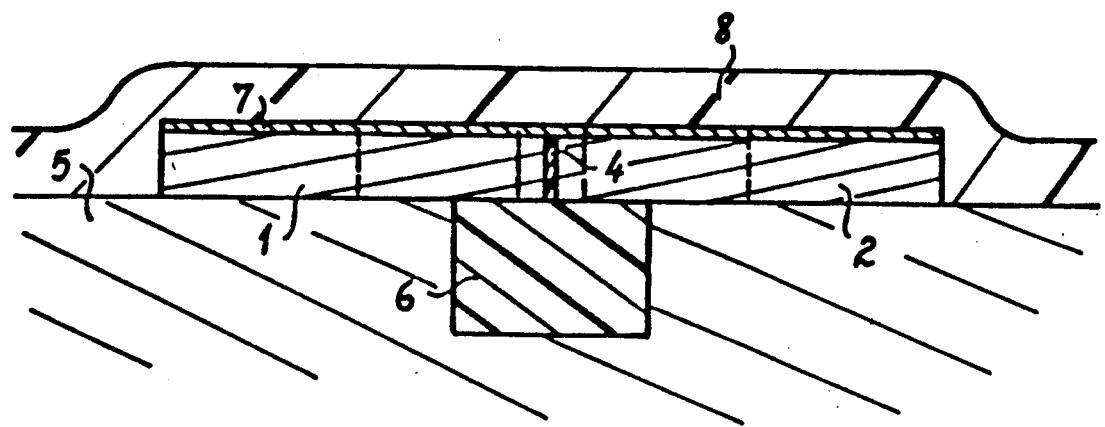

A dielectric material (alumina, silica, for example) is then deposited on the entire structure. The thickness of this deposit is at least equal to the thickness of the magnetic materials forming the poles. FIG. 4 illustrates this stage of the method. It corresponds to a section AA of FIG. 3 and has, in addition, the layer 8 of the dielectric material.

Before depositing the layer 8, care will be taken to anticipate a possibility of electrical connection with magnetic poles having low resistivity (typically of the order 100μ cm.) These electrical connections may be provided for at any time during the execution of the method for making magnetic heads, but before the deposition of the dielectric layer 8.

Depending on the use planned for these heads and the grinding method used, all the heads, or only a restricted number of them, judiciously distributed over the processed wafer, may be provided with these connections.

With a view to clarity, the rest of the description will deal solely with the finishing of a single head, i.e. its cylindrical grinding operation to achieve the size of the gap. This head is provided with connection contacts connected to each pole. The resistance measured between the poles at this stage of the method is, therefore, very low.

Figure 5:
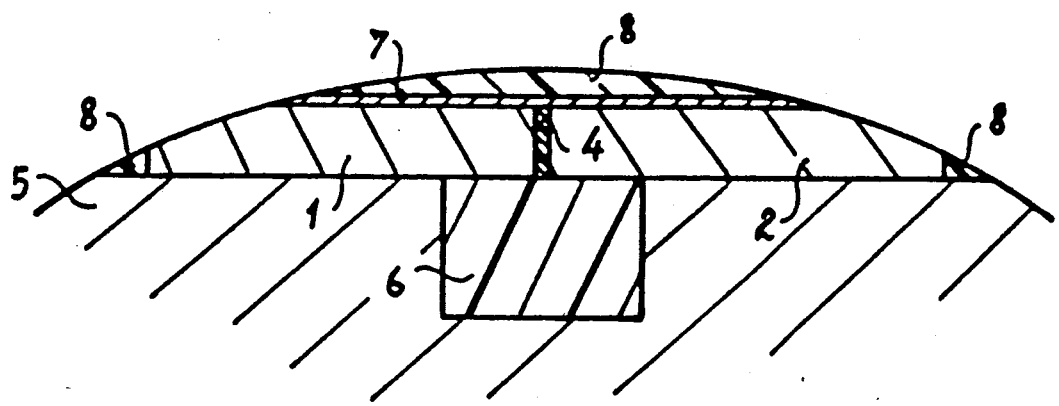
Figure 6:
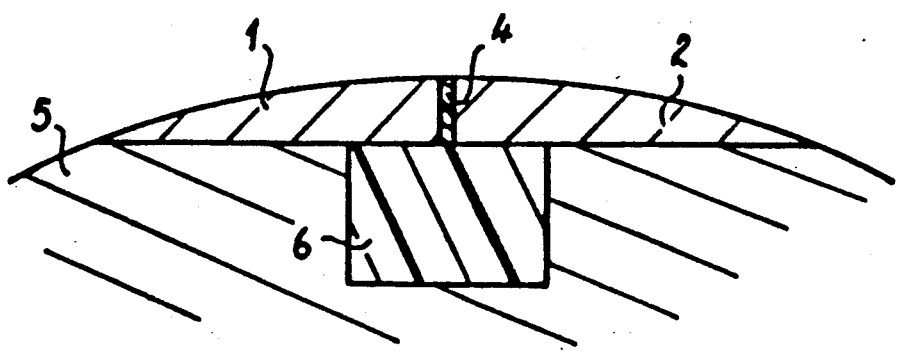

The head then undergoes the final cylindrical grinding operation as shown in FIG. 5. This grinding is done symmetrically with respect to the gap. The dielectric layer 8 gradually takes on a cylindrical profile, and the magnetic poles 1 and 2 also begin to be worked upon at their ends opposite the gap 4. The resistivity between the poles varies only very little during this grinding operation until the part of the conductive layer 7, located above the gap, is in turn removed, as shown in FIG. 6. At this point, the resistivity between the two poles suddenly becomes very great and the grinding is stopped, the specified dimension having been achieved. The detection of the sudden change in resistivity can be done by any means known to those skilled in the art. A simple ohmeter is enough.

The method described herein for a separated head undergoing cylindrical grinding can be adapted to plane grinding operations. It may be used to set the dimension of the depth of the gap for several heads in group processing operations. These heads would then be either in the form of strips, or again, with the entire wafer. In these group processing operations, only some judiciously chosen heads will have their resistance between the poles measured.

The method according to the invention is a very simple means for detecting the instructed size to be achieved. It is a method working on an all or nothing basis, thus making it easy, to the utmost, to detect this dimension, even with rudimentary means. The implementation of the method according to the invention requires only one additional deposition step during the method for making the heads. The connection of electrical contacts on the poles depends on the final type of geometry planned for the heads. Since the detection is very simple, it is no longer indispensable for an operator to be present to assess the progress and descent towards the instructed dimension and to take the decision to stop the machine. The method can be very easily automated.

The dielectric layer 8 remains in certain places and, in particular, in the etched parts of the magnetic poles, on each side of the gap 4, thus preventing deterioration in the magnetic reading or writing medium.

We claim:

1. Method for the detection of the end of grinding of at least one thin layer magnetic head, the head comprising, at the stage of implementation of said method, an active face, formed by two magnetic poles separated by a gap, the detection being obtained through the interruption of an electrical circuit, characterized in that it comprises the following steps:

deposition of a conductive layer on the entire active face to form said electrical conduit;

etching of the active face coated with said conductive layer;

deposition of a layer of dielectric material on the etched active face;

grinding of the active face starting from the face that is free of the layer of dielectric material until total removal of that part of the conductive layer located above said gap, said removal being detected by the sudden variation in resistivity between the two magnetic poles.

2. Method according to claim 1, characterized in that the grinding is of the cylindrical type.

3. Method according to claim 1, characterized in that the grinding is of the plane type.

4. Method according to claim 2, characterized in that the grinding of the active face is achieved symmetrically with respect to said gap.

5. Method according to claim 1 characterized in that the thickness of the layer of dielectric material is at least equal to the thickness of the magnetic poles.

6. Method according to claim 1 wherein said conductive layer (7) is formed by aluminium or chromium.

7. Method according to any of the claims 1 to 6, characterized in that said layer of dielectric material is formed by alumina or silica.

* * * * *